United States Patent Office

2,979,382
Patented Apr. 11, 1961

2,979,382

METHOD FOR PREPARING INFRARED TRANSMITTIBLE ARSENIC TRISULFIDE

Rudolf Frerichs, Evanston, Ill., assignor to Research Corporation, New York, N.Y., a corporation of New York No Drawing. Filed May 10, 1951, Ser. No. 225,666

2 Claims. (Cl. 23—136)

This invention relates to optical glasses having high transmission in the infrared, similar to natural or artificial crystals such as sodium chloride, and to optical elements made therefrom. The term "high transmission" is intended to denote transmission values which are predominately determined by the reflection losses at the two surfaces of the highly refractive glass thus indicating very small true absorption in the glass body.

More particularly the invention relates to sulfide glasses having a high transparency between the red end of the visible and 12 microns which makes these glasses suitable for replacing the hitherto used crystals in optical instruments and devices, and to selenide glasses having high transparency between the red end of the visible and values up to 21 microns depending on the nature of the added compound.

The problem solved by this invention is the replacement of the customary glass-forming oxides, for instance silica or boron tri-oxide, by suitable sulfides and selenides which produce the desired optical and mechanical properties of such glasses, in the same way as the addition of the common oxides to the mentioned glass-forming oxides produces the vast number of optical oxide glasses.

Arsenic trisulfide can be obtained in a glassy state if the velocity of cooling is sufficient to prohibit crystallization of the melt, and I have found that high transparency of this compound extends from the red end of the visible spectrum towards 12 to 13 microns, if the arsenic trisulfide is suitably processed.

It has been found that arsenic trisulfide treated in this way either alone or compounded with suitable components forms glasses which have the desired high transparency in the infrared, which withstand the processes inherent in the manufacturing such as molding, sawing, grinding, annealing, cementing and the like, and which are insoluble in water. The negligible solubility of such glasses is of special importance as the hitherto used crystals (i.e., rock salt) are very hygroscopic.

Among the compositions of particular utility in the production of optical elements of high transmission in the infrared region are solid solutions of sulfur, selenium and various sulfides in arsenic trisulfide, as well as vitreous selenium and vitreous mixtures of selenium and tellurium. The relative proportions of the various components may be varied over the range in which vitreous solid solutions are obtainable in accordance with the optical properties desired.

EXAMPLE I

Arsenic trisulfide

The chemical compound arsenic trisulfide in its glassy form is transparent in the infrared. In order to obtain clear transparent pieces of different centimeters thickness, it is advantageous to process the arsenic trisulfide in the following way: the arsenic trisulfide is purified by repeated distillations (2 to 3 times) in a slow stream of hydrogen sulfide in a quartz distilling tube at about 700° C. A surplus of hydrogen sulfide introduced in this purifying process has to be removed by violent boiling of the sulfide for about 30 minutes at 700° C. without the stream of hydrogen sulfide passing through the distillation apparatus.

The casting of the arsenic trisulfide into form for manufacture into lenses, optical wedges, prisms and the like is advantageously effected in glass molds placed on a solid iron plate heated to not less than 120° C. and not more than 150° C. If the iron plate is colder the glass cracks due to the tensions produced by the fast chilling and if it is hotter the glass shows a tendency to crystallize. Arsenic trisulfide purified and treated in the way described shows a high transmission between the red end of the visible spectrum and 12 to 13 microns, the latter value depending on the thickness of the sample.

EXAMPLE II

Arsenic trisulfide and sulfur

Arsenic trisulfide and sulfur between 0 and 66 percent by weight thoroughly mixed, molten and chilled under the conditions described in Example I form clear optical glasses which can be processed by the usual methods and which have high transparencies extending from the red end of the visible up to 12 to 13 microns. The color of these glasses deepens from yellow to dark red with decreasing amounts of sulfur. The absorption in the infrared, which is quite uniform in mixtures with small amounts of sulfur, shows more and more pronounced absorption bands contributed to elementary sulfur if the amount of sulfur increases. These bands are situated at 7.78, 10.8 and 11.9 microns. These bands make these glasses useful as filters absorbing this particular spectral region, while passing the other regions of the infrared spectrum up to 13 microns.

EXAMPLE III

Arsenic trisulfide and boron sulfide

Arsenic trisulfide and between 1 and 10 percent by weight of boron trisulfide forms optical glasses which have high uniform transmission between the red end of the visible and 13 microns.

EXAMPLE IV

Arsenic trisulfide and lead sulfide

A mixture of arsenic trisulfide with lead sulfide produces a glass with high and uniform transmission between 1.4 microns and 13 microns if the amount of lead sulfide is about 9 percent by weight of the arsenic sulfide. This composition represents a valuable filter transmitting freely infrared and no trace of visible light. Lower amounts of lead sulfide decrease the effect of absorption below 1.4 microns; higher amounts produce a tendency to crystallize the glass.

EXAMPLE V

Aresenic trisulfide and antimony trisulfide

A mixture of arsenic trisulfide and 10 percent by weight of antimony trisulfide produce a glass with little transmission between 1 and 9 microns and high transmission between 9 and 12 microns. This glass is a valuable filter for transmitting the range 9 to 12 microns. Smaller amounts of antimony trisulfide produce smaller effects; and higher amounts show a tendency to devitrification.

EXAMPLE VI

*Arsenic trisulfide and selenium*

Mixtures of arsenic trisulfide and selenium produce glasses whose transmission gradually increases from 1 micron up to longer wavelengths. With small amounts of selenium, 10 percent by weight, the transmission reaches two maxima at 6 and 11 microns. With increasing amounts, up to 50% selenium by weight, the glasses can be made with a uniform high transmission between 1 and 12 microns. It is to be noted that selenium depresses the transmission at the red end of the spectrum, thus making such glasses useful as filters transmitting the infrared 1 to 12 microns and absorbing the far end of the visible spectrum and the near region of the infrared up to 1 micron.

EXAMPLE VII

*Arsenic trisulfide and thallium trisulfide*

It has been found that thallium trisulfide forms good optical glasses in connection with arsenic trisulfide as a glass former. Amounts up to 50 percent of thallium trisulfide by weight form stable and clear glasses with arsenic trisulfide. The transmission of these glasses is high between the extreme red end of the visible and 13 microns. It has been found that higher amounts than 50 percent of thallium trisulfide by weight produce a tendency to crystallize in such glasses.

EXAMPLE VIII

*Glassy selenium*

Selenium has been obtained before in the glassy state, however, the observations of the optical transmission of glassy selenium have been made up to now only with very thin layers of less than 1 mm. thickness. It has now been found that repeated distillation of selenium in air at temperatures of 700° C. purifies the selenium in such way that thicknesses of a few millimeters show high transmission between the red end of the visible spectrum and 21 microns. Selenium which is not subjected to such repeated distillations is not transmittant in this region.

EXAMPLE IX

*Glassy selenium and tellurium*

Mixtures of glassy selenium and up to 33 percent by weight of tellurium produce glasses with high transmission between 1 and 15 microns. While small percentages of tellurium reduce the transmission beyond this value larger amounts than 33 percent by weight produce a tendency to crystallize in such glasses.

I claim:

1. A method of making arsenic trisulfide having a high transmission in the infrared region of the spectrum which comprises distilling arsenic trisulfide in a stream of hydrogen sulfide and thereafter boiling the excess hydrogen sulfide out of the arsenic trisulfide.

2. A method of making vitreous arsenic trisulfide having a high transmission in the infrared region of the spectrum which comprises distilling arsenic trisulfide in a stream of hydrogen sulfide and thereafter boiling the excess hydrogen sulfide out of the arsenic trisulfide and casting the arsenic trisulfide in a mold at a temperature between about 120° C. and 150° C.

References Cited in the file of this patent

UNITED STATES PATENTS

| | | |
|---|---|---|
| 2,512,257 | Pfund | June 20, 1950 |
| 2,660,925 | Turner | Dec. 1, 1953 |

FOREIGN PATENTS

| | | |
|---|---|---|
| 289,775 | Italy | Oct. 27, 1931 |
| 462,304 | Great Britain | 1937 |

OTHER REFERENCES

Webster's New Int. Dictionary, Unabridged, pub. 1947 by G. & C. Merriam Co., Springfield, Mass., pp. 154 and 2269.

Mellor: "Comprehensive Treatise on Inorganic and Theoretical Chemistry, vol. 9, pp. 272–289 (1929), Longman, Green and Co., London.